No. 673,950. Patented May 14, 1901.
W. GRUNER.
FLOOD GATE.
(Application filed Nov. 19, 1900.)
(No Model.)
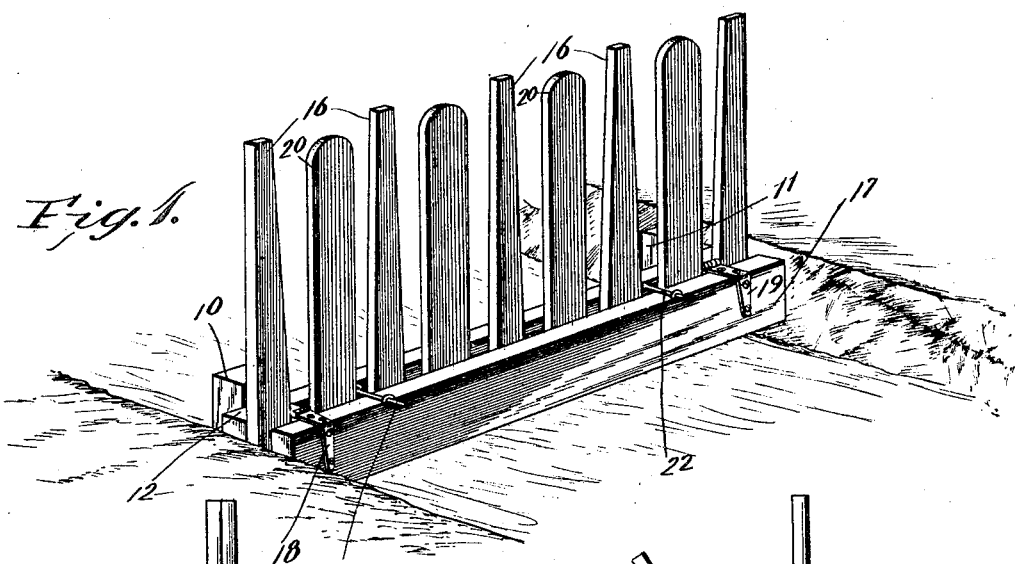
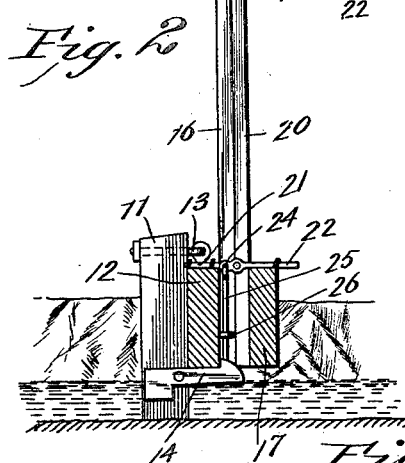
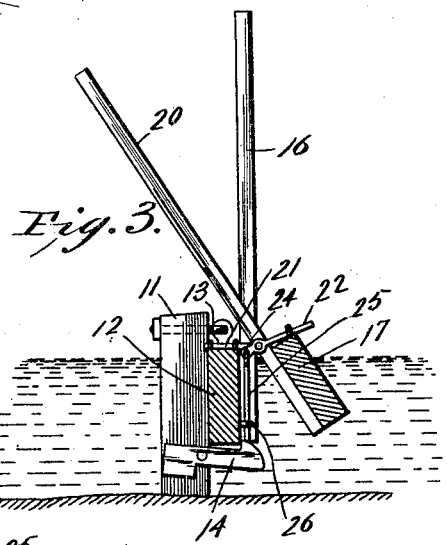
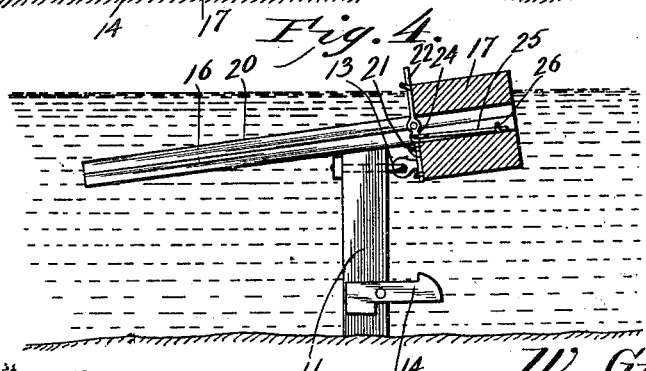
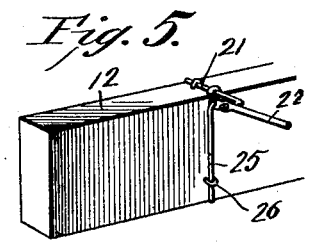
Witnesses
W. Gruner, Inventor.
Attorneys
THE NORRIS PETERS CO., PHOTO-LITHO., WASHINGTON, D. C.

UNITED STATES PATENT OFFICE.

WILLIAM GRUNER, OF LAWNRIDGE, ILLINOIS.

FLOOD-GATE.

SPECIFICATION forming part of Letters Patent No. 673,950, dated May 14, 1901.

Application filed November 19, 1900. Serial No. 37,038. (No model.)

*To all whom it may concern:*

Be it known that I, WILLIAM GRUNER, a citizen of the United States, residing at Lawnridge, in the county of Stark and State of Illinois, have invented a new and useful Flood-Gate, of which the following is a specification.

This invention relates to flood-gates; and it has for its object to provide a gate of this nature which will stand normally erect and in position to prevent passage of stock from one side to the other thereof and which will be unlatched automatically when the water rises to permit of the gate lying down, so that the water may pass freely thereover, further objects and advantages of the invention being evident from the following description.

In the drawings forming a portion of this specification, and in which like numerals of reference indicate similar parts in the several views, Figure 1 is a perspective view showing the gate in its normal position. Fig. 2 is a transverse section showing the gate in its normal or latched position. Fig. 3 is a transverse section showing one member moved to a position to operate the latch to release the other section or member of the gate. Fig. 4 is a transverse section showing the entire gate in its reclining position. Fig. 5 is a perspective view showing the cross-beam of the latched member and the mechanism for releasing the latch.

Referring now to the drawings, the present gate comprises two supporting-posts 10 and 11, which are driven into the bed of a stream and upon which the movable sections or members of the gate are mounted. One of the movable members of the gate consists of a cross-beam 12, having eyebolts engaged therewith and projecting from its upper face, and with these eyebolts are engaged other eyebolts 13, engaged transversely through the upper portions of the supporting-posts. The transverse beam 12 is held normally flat against the upstream faces of the supporting-posts by means of pivoted latches 14 and 15, mounted on the side faces of the posts, the rear ends of these latches being sufficiently heavy to hold the forward engaging ends thereof normally raised into engagement with the cross-beam. The cross-beam 12 has a plurality of palings 16 secured to its upstream face and which palings project above the beam and are spaced sufficiently close together to prevent passage of stock. When the beam 12 is released by the latches, it may be moved by the force of water-pressure against its palings to lie horizontal, or approximately so, as illustrated in Fig. 4. The second gate member comprises also a cross-beam 17, and connecting the upper faces of the two beams are strap-hinges 18 and 19, which permit the second beam to swing while the first beam is latched against movement. The beam 17 is provided with upright palings 20 on its downstream face, and which palings alternate with the palings of beam 12, the palings 20 being of such width that when the stream rises to flow over the beams the water-pressure on these palings will be sufficient to tilt the beam 17, aided by the buoyancy of said beam. The beam 17 is adapted to release the latches that hold the beam 12 when the water has reached a sufficient height, and for this purpose the following mechanism is provided:

A pintle 21, in the form of a straight rod having a laterally-turned end, is attached to the upper face of beam 12 and adjacent to each end thereof, the laterally-turned ends of the rods projecting to lie over the interspace that separates the two beams, and pivoted on the laterally-turned end of each rod is a lever 22. Each of these levers 22 is fixed upon the upper face of the beam 17, and they project inwardly beyond their points of engagement with the pintles and are provided at their inner ends with eyes 24, with which are engaged releasing-rods 25, which are passed slidably through guide-eyes 26 on the upstream face of the beam 12, so as to guide the rods in their downward movement to engage the engaged ends of the latch-levers and depress them to release the beam 12. This operative movement of the levers and their connected rods is accomplished when the beam 17 swings upwardly when the stream rises. When this release of the beam 12 is effected, said beam tilts to the position shown in Fig. 4.

The normal positions of the beams are shown in Fig. 2. The position of beam 17 when about to release beam 12 is shown in Fig. 3, and the final positions of both beams are shown in Fig. 4.

When the water subsides, both members of the gate rise to their normal positions, the beam 12 engaging and depressing the latch-levers to pass therebehind and permit them to rise to their engaging positions.

It will be understood that in practice various modifications of the specific construction shown may be made and that any suitable materials and proportions may be used for the various parts without departing from the spirit of the invention, it being noted that when either both gate members or the first member alone is erect the stock is prevented from passing.

What is claimed is—

1. In a water-gate, the combination with supporting-posts, of a gate member comprising a beam hinged to the posts and having pickets, latches for holding the beam with the pickets erect, a second gate member comprising a beam hinged to the first beam and provided with pickets, and connections between the second beam and the latches for operating the latter to release the first beam when the second beam is moved upon its hinges.

2. In a water-gate, the combination with a hinged gate member having pickets, of latches for holding the member with its pickets in operative position, a second gate member hinged at the upstream side of the first member and having pickets, and connections between the second member and the latches for operating the latter to release the first member when the second member is moved on its hinges.

3. In a water-gate, the combination with supporting-posts, of a gate member including a beam hinged to the posts, latches pivoted to the posts for engagement with the beam, said beam having pickets, a second gate member including a beam hinged to the first beam and having pickets alternating with the pickets of the first beam to lie therebetween, and means carried by the second beam for operating the latches to release the first beam when the second beam is moved on its hinges.

In testimony that I claim the foregoing as my own I have hereto affixed my signature in the presence of two witnesses.

WILLIAM GRUNER.

Witnesses:
  OWEN W. HURD,
  ED. H. MALLARY.